United States Patent Office 3,316,368
Patented Apr. 25, 1967

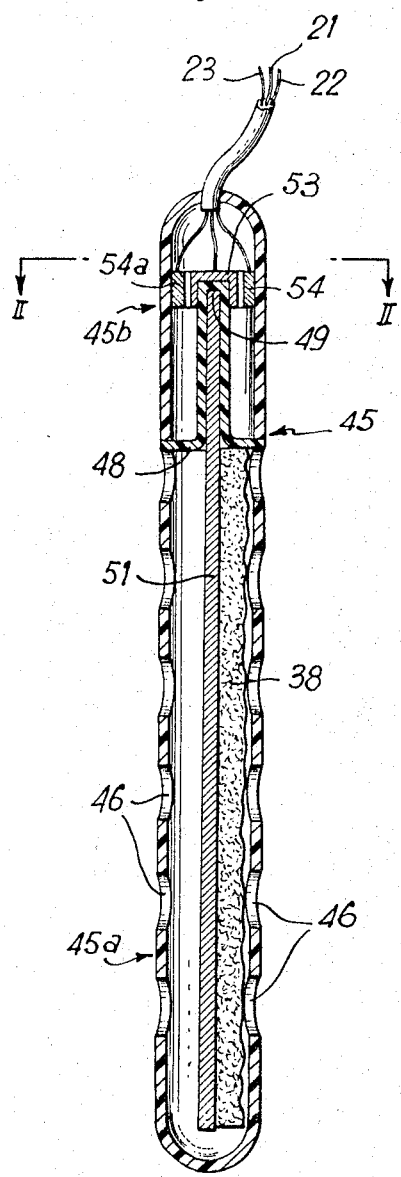
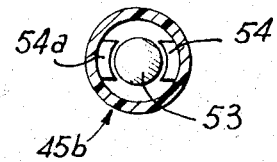

3,316,368
ELECTRICAL PROBE FOR A LIQUID DETECTING DEVICE
Albert Alexandre Henri Veau, 23 Place de Verdun, Pont-Audemer, France
Filed Dec. 22, 1965, Ser. No. 515,695
Claims priority, application France, Dec. 31, 1964, 556; Feb. 5, 1965, 23,553
4 Claims. (Cl. 200—61.04)

The invention relates to an electrical probe adapted to control a signaling device for indicating the presence of a very humid environment, or of a liquid such as water or urine, and adapted particularly to combat enuresis in children.

The present invention includes an elongated casing divided into two chambers one of which is watertight and the other is porous. The partition between the chambers is resilient and one end of a movable electrical contact passes therethrough. Corresponding stationary contacts are fixedly mounted in the watertight chamber adjacent the free end of the movable contact. Means are provided in the porous chamber for moving the movable contact into engagement with the stationary contacts.

The invention will be further described, by way of example with reference to the accompanying drawings in which:

FIG. 1 is a longitudinal sectional view of one embodiment of an electrical probe according to the invention; and FIG. 2 is a cross section of the probe taken along line II—II of FIG. 1.

The body 45 of the probe illustrated in the drawings is constituted by a generally cylindrical elongated insulating casing terminated by round, for example semispherical portions. The major portion of the body 45 of the probe, shown at 45a, is porous, for example perforated at 46, whilst the other portion 45b is tightly closed, for example by a diaphragm 48 of natural or synthetic rubber, forming a deep cavity or pocket 49 located substantially in the axis of the body of the probe; one end of a rigid control rod 51 is engaged in this cavity whilst a strip of spongy material 38, for example, a synthetic sponge is located between one face of the rod 51 and the inner face of the porous wall 45a of the body of the probe.

A metal cap 53 is fixed to the outer face of the end portion of pocket 49 and forms one of a pair of electrical contacts, the other contact 54 of which is fixed to the inner wall of the portion 45b of the body of the probe. In this embodiment the probe also comprises an opening contact comprising the central or movable contact 53 and an additional contact 54a arranged in the body of the probe opposite the contact 54, relative to the central contact 53.

Electrical wires 21, 22, and 23 are connected to the contacts 53, 54, and 54a, respectively, and extend through portion 45b of the body of the probe to thus form means for suitably connecting the probe to a signaling apparatus.

It may be seen that the casing 45 is divided by the diaphragm 48 into two chambers, namely, a sponge containing chamber pervious to liquid and a liquid tight chamber containing the electrical contacts which are thereby protected from any possible detrimental action of the liquid.

The operation of the probe is as follows:

When the probe is in an environment of low humidity, the sponge 38 is practically dry so that the rod 51 is held by the elasticity of the diaphragm 48 substantially in the axis of the body of the probe, and the movable contact 53 is spaced apart from the fixed contact 54.

When the probe is in a liquid or very humid environment the expansion of the sponge 38 causes the rod 51 to pivot about the diaphragm 48, so that the movable contact 53 comes to rest against the contact 54. Consequently, the presence of a liquid about the probe will cause completion of the circuit through wires 21 and 22 and energization of the signaling device, such as illumination of a bulb or energization of a sounding device.

If the arrangement is such that in the dry state the movable contact 53 rests against the contact 54a, the energizing circuit of the signalling apparatus, for example a lamp, is closed when the probe is in a dry environment, whilst in a humid environment the contacts 53 and 54a are separated and cause the extinction of the lamp.

Obviously the invention, hereinbefore described merely by way of example, may be modified in many ways without thereby departing from its principle.

Thus, instead of having both the closing pair of contacts 53 and 54 and the opening pair of contacts 53 and 54a, the probe might be equipped with only a pair of opening contacts or only a pair of closing contacts as desired.

I claim:

1. An electrical probe adapted to control a signaling device for indicating the presence of a liquid environment, said electrical probe comprising in combination: an elongated casing with a transverse liquid tight partition dividing said casing into two chambers, one of said chambers having liquid tight walls while the other chamber has porous walls, said partition being formed with a central resilient elongated pocket directed towards said liquid tight chamber; a rigid control rod having one end portion secured within said pocket, the remaining portion of said rod extending in said porous wall chamber; a strip of spongy material positioned between one side of said remaining portion of said rod and said porous wall; a movable electric contact secured to the outer face of said elongated pocket; a fixed contact secured to the inner face of said liquid tight wall and mounted so as to be capable of coacting with said movable contact upon said remaining portion of said rod being deflected laterally by swelling of said spongy material subjected to the action of a liquid entering said porous wall chamber; and insulated electrical wires leading out from said electric contacts through said liquid tight wall.

2. An electrical probe as defined in claim 1, wherein said fixed contact is positioned on a portion of said liquid tight wall which is approached by said movable contact when said rod is deflected, so as to produce engagement of said fixed and movable contacts.

3. An electrical probe as defined in claim 1, wherein said fixed contact is positioned on a portion of said liquid tight wall from which said movable contact is moving away when said rod is deflected, so as to produce separation of said fixed and movable contacts, while said fixed contact is in engagement with said movable contact in non-deflected position of said rod.

4. An electrical probe as defined in claim 1, wherein said fixed contact comprises a first fixed contact member positioned on a portion of said liquid tight wall which is approached by said movable contact when said rod is deflected so as to produce engagement of said fixed and movable contacts, and a second fixed contact member positioned on a portion of said liquid tight wall from which said movable contact is moving away when said rod is deflected so as to produce separation of said second fixed contact member and movable contacts, while said second fixed contact member is in engagement with said movable contact in non-deflected position of said rod.

References Cited by the Examiner
UNITED STATES PATENTS

| | | | |
|---|---|---|---|
| 2,943,167 | 6/1960 | Hughes et al. | 200—140 |
| 3,204,872 | 9/1965 | Whear | 200—61.06 |

BERNARD A. GILHEANY, *Primary Examiner.*

H. E. SPRINGBORN, *Assistant Examiner.*